(12) United States Patent
Bucheton

(10) Patent No.: US 9,221,534 B2
(45) Date of Patent: Dec. 29, 2015

(54) DEVICE FOR CONNECTING A GEARMOTOR TO AN AIRCRAFT WHEEL IN ORDER TO ENABLE THE WHEEL TO BE DRIVEN SELECTIVELY BY THE GEARMOTOR

(71) Applicant: MESSIER-BUGATTI-DOWTY, Velizy-Villacoublay (FR)

(72) Inventor: Daniel Bucheton, Le Chesnay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 250 days.

(21) Appl. No.: 13/650,301

(22) Filed: Oct. 12, 2012

(65) Prior Publication Data

US 2013/0091969 A1 Apr. 18, 2013

(30) Foreign Application Priority Data

Oct. 14, 2011 (FR) .................................... 11 59308

(51) Int. Cl.
| | | |
|---|---|---|
| *B64C 25/40* | (2006.01) | |
| *F16C 39/02* | (2006.01) | |
| *F16C 19/52* | (2006.01) | |
| *F16C 21/00* | (2006.01) | |

(52) U.S. Cl.
CPC .............. *B64C 25/405* (2013.01); *F16C 19/52* (2013.01); *F16C 21/00* (2013.01); *F16C 39/02* (2013.01); *F16C 2326/43* (2013.01); *F16C 2361/61* (2013.01); *Y02T 50/823* (2013.01); *Y10T 74/19614* (2015.01)

(58) Field of Classification Search
CPC ...... H02K 7/108; H02K 7/116; B64C 25/405; F16C 19/52; F16C 21/00
USPC ................... 74/421 A; 310/78; 384/126–128; 301/6.2; 244/103 S
See application file for complete search history.

(56) References Cited

U.S. PATENT DOCUMENTS

| | | | |
|---|---|---|---|
| 665,318 A * | 1/1901 | Garrett | 477/13 |
| 2,500,577 A | 3/1950 | Sands, Jr. | |
| 6,705,410 B2 * | 3/2004 | Ziegler | 173/178 |
| 6,712,515 B2 * | 3/2004 | Fite et al. | 384/126 |
| 2004/0196027 A1 * | 10/2004 | Iwamoto et al. | 324/207.21 |
| 2006/0110086 A1 | 5/2006 | Morita et al. | |
| 2011/0156472 A1 | 6/2011 | Bucheton et al. | |

FOREIGN PATENT DOCUMENTS

EP 0499310 A1 8/1992

* cited by examiner

*Primary Examiner* — William C Joyce
(74) *Attorney, Agent, or Firm* — Sughrue Mion, PLLC

(57) ABSTRACT

A device for connecting a gearmotor to an aircraft wheel, the device comprising: a casing rotatably carrying a shaft that is to be driven by the gearmotor, and on which a pinion is mounted idle by means of a rolling bearing; a toothed ring for being constrained in rotation with the aircraft wheel and arranged to mesh permanently with the idle pinion; and rotation securing structure for selectively constraining the idle pinion in rotation with the shaft. A bushing is interposed between the shaft and the rolling bearing of the idle pinion.

4 Claims, 2 Drawing Sheets

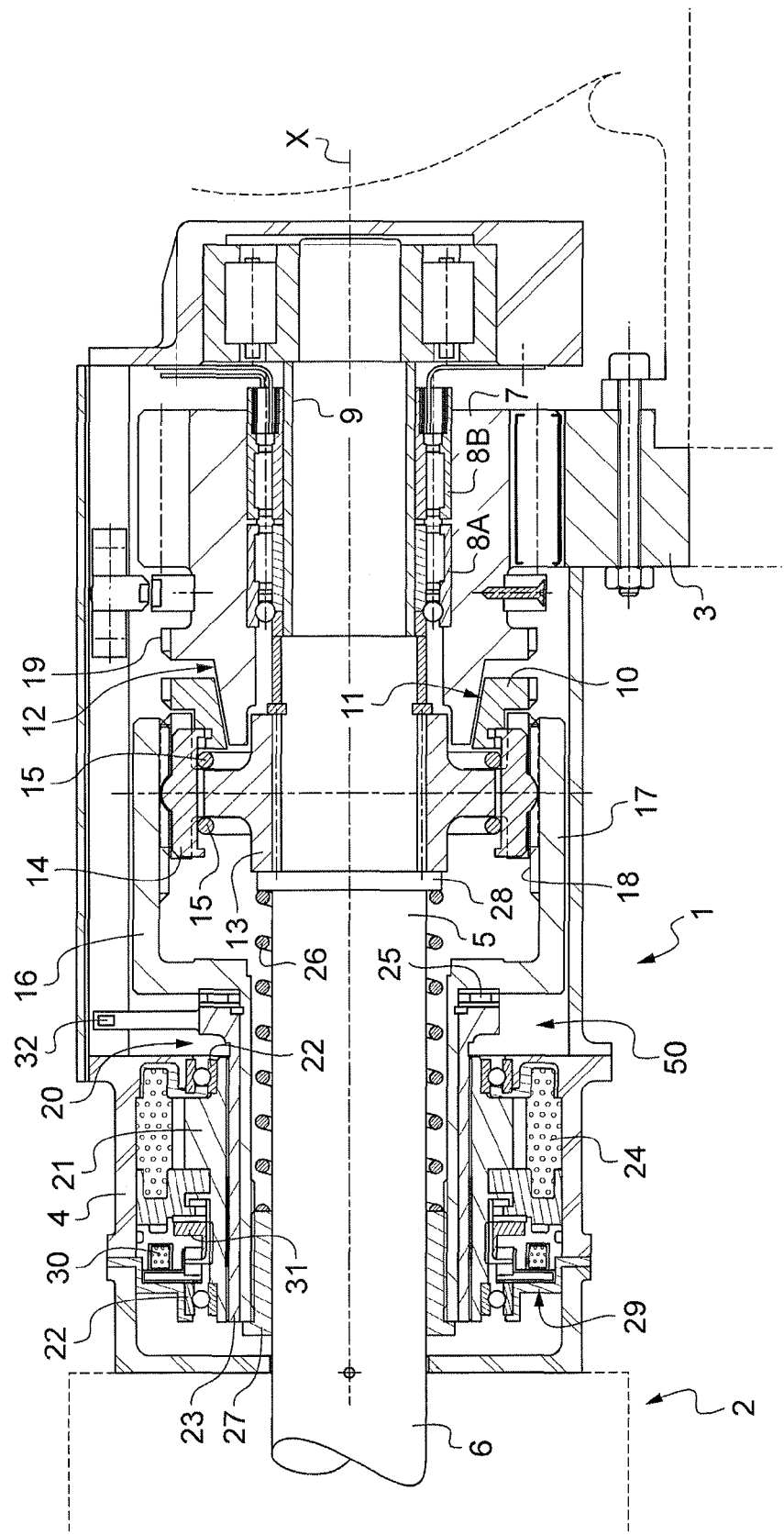

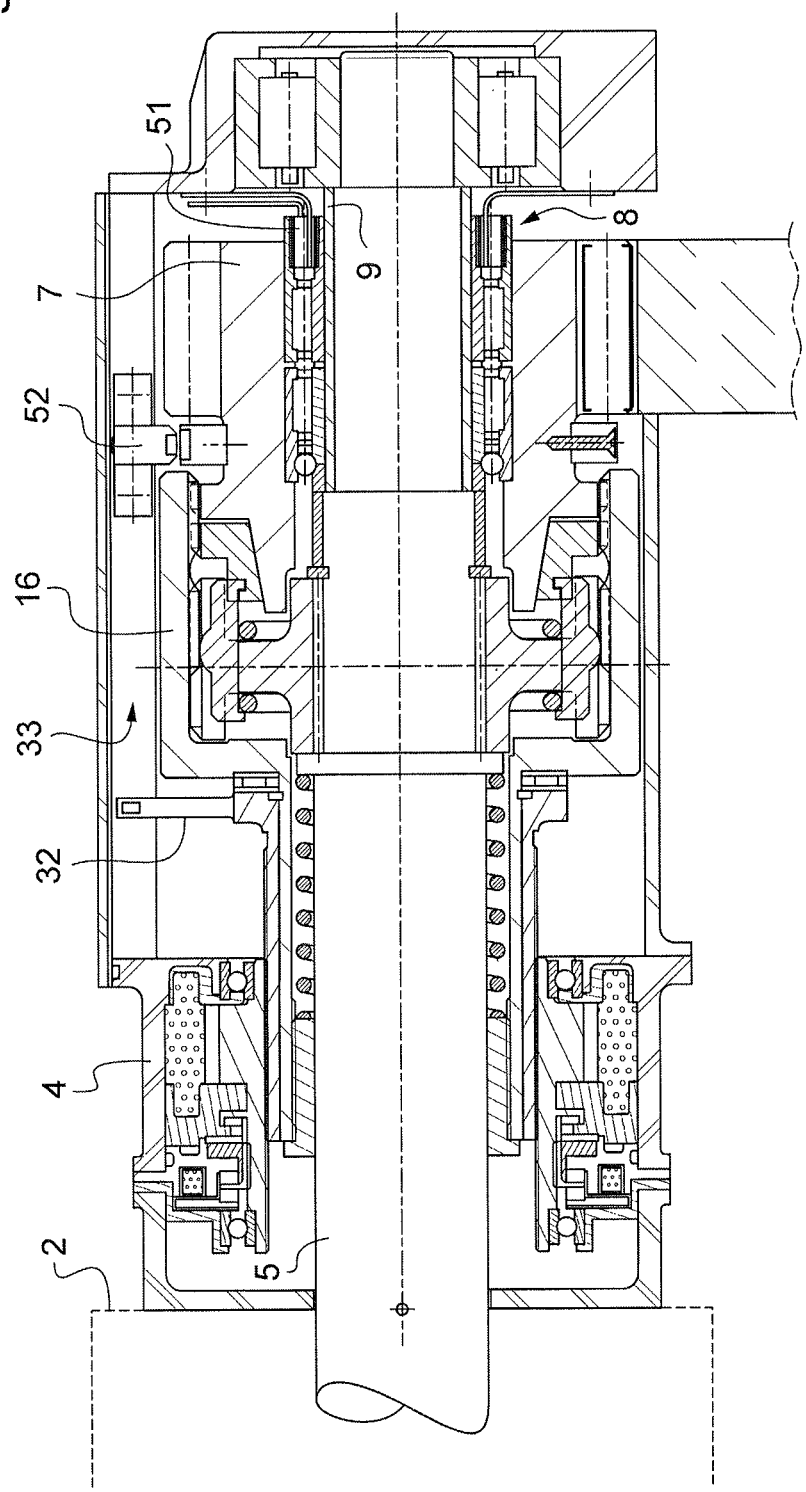

DEVICE FOR CONNECTING A GEARMOTOR TO AN AIRCRAFT WHEEL IN ORDER TO ENABLE THE WHEEL TO BE DRIVEN SELECTIVELY BY THE GEARMOTOR

The invention relates to a device for connecting a gearmotor to an aircraft wheel in order to enable the wheel to be driven selectively by the gearmotor.

TECHNOLOGICAL BACKGROUND OF THE INVENTION

Document FR 2 954 752 discloses a wheel-and-brake assembly with a gearmotor arranged to drive the wheel in rotation. The brake includes a carrier for carrying braking actuators, which carrier also carries the gearmotor and toothed ring permanently meshing with the gearmotor. A clutch member enables the toothed ring to be selectively connected with the wheel in order to enable the wheel to be driven by the gearmotor. Specifically, that member is an electromagnetic clutch that also extends around the actuator carrier.

Although that type of device presents numerous advantages, it can sometimes be difficult to house in the crowded environment of an aircraft wheel.

There is therefore a need for a device for connecting a gearmotor to an aircraft wheel that is easier to house.

In particular, consideration has been given to constraining the toothed ring in rotation with the wheel, and interposing an idle pinion connection device between the gearmotor and the toothed ring. The pinion is mounted idle on the shaft of the device, which shaft is connected to the gearmotor in order to be driven in rotation. Clutch engagement means act selectively to enable the idle pinion to be constrained selectively to rotate with its shaft in order to provide a connection between the toothed ring and the gearmotor. Nevertheless, the idle pinion is generally also mounted on its shaft via a rolling bearing, such as a roller bearing or a needle bearing. In the event of the bearing of the idle pinion jamming, the gearmotor is connected to the wheel of the aircraft, thereby running the risk of the gearmotor being driven by the wheel, and given the gear ratios that are used, that can lead to the gearmotor being rotated dangerously fast.

OBJECT OF THE INVENTION

An object of the invention is to provide a device for connecting an idle pinion of a gearmotor to an aircraft wheel that is capable of allowing the wheel to rotate freely, even if the bearing of the idle pinion has jammed.

BRIEF DESCRIPTION OF THE INVENTION

In order to achieve this object, the invention provides a device for connecting a gearmotor to an aircraft wheel, the device comprising:
- a casing rotatably carrying a shaft that is to be driven by the gearmotor, and on which a pinion is mounted idle by means of a rolling bearing;
- a toothed ring for being constrained in rotation with the aircraft wheel and arranged to mesh permanently with the idle pinion; and
- rotation constraining means for selectively constraining the idle pinion in rotation with the shaft.

According to the invention, a smooth bearing is interposed between the shaft and the rolling bearing of the idle pinion. Thus, even if the rolling bearing jams, the pinion can nevertheless rotate while being driven by the aircraft wheel but without rotation of the idle pinion being transmitted to the shaft and thus to the gearmotor. Naturally, when the pinion is constrained in rotation with the shaft, both bearings, i.e. including the smooth bearing, are rendered ineffective, so that they do not prevent torque being transmitted between the shaft and the pinion.

BRIEF DESCRIPTION OF THE FIGURES

The invention can be better understood on reading the following description of a particular embodiment given with reference to the figures of the accompanying drawings, in which:

FIG. 1 is a longitudinal section view of a device of the invention, the pinion being decoupled from the shaft; and FIG. 2 is a view analogous to that of FIG. 1, the pinion being coupled to the shaft.

DETAILED DESCRIPTION OF AN EMBODIMENT OF THE INVENTION

With reference to FIG. 1, the connection device 1 of the invention is for providing a rotary connection between a gearmotor 2 (represented by dashed lines in the figures) and an aircraft wheel via a toothed ring 3 secured to the wheel (also represented by dashed lines).

The device comprises a casing 4 in which a shaft 5 is mounted to rotate about an axis of rotation X. The shaft 5 has an end 6 that projects from the casing 4 in order to be driven in rotation by the gearmotor 2. The shaft 5 carries a pinion 7 that is mounted idle on the shaft by means of a roller bearing 8, made up in this example of two roller bearings 8A and 8B side by side. Under normal circumstances, the pinion 7 is free to rotate, thereby separating the gearmotor 2 in rotation from the toothed ring 3, and thus from the wheel of the aircraft. This applies for example during takeoff or during landing. During these stages, the speed of rotation of the aircraft wheel may be high, and if the gearmotor were to be connected to the wheel, then the motor of the gearmotor would be made to rotate at a very high speed, thereby running the risk of damaging it.

In contrast, while the aircraft is moving at low speed on the ground, the gearmotor needs to be connected to rotate with the wheel in order to be capable of driving it in rotation, thereby enabling the aircraft to move without any contribution from its jets. For this purpose, the device is provided with rotation constraining means 50 for constraining the idle pinion 7 in rotation with its shaft 5, which means are described in greater detail below.

When the idle pinion 7 is free to rotate, it is important to avoid jamming the roller bearing 8. Although such an event is rare, it is not impossible, and it may occur if one of the rollers breaks, or if dirt becomes interposed between the rollers. Consequently, an opposing torque develops in the roller bearing 8, thereby constraining the idle pinion 7 in rotation with the shaft 5, so that the pinion begins to turn, being driven by the rotation of the wheel.

In order to avoid that situation, and according to the invention, a smooth bearing 9 is interposed between the roller bearing 8 and the shaft 5, which smooth bearing is mounted as a tight fit on the shaft 5, but it is mounted to rotate relative to the roller bearing 8, thus forming a second bearing in series with the roller bearing 8.

Under normal circumstances, the idle pinion 7 rotates about the shaft by virtue of the rollers in the roller bearing 8, without driving the shaft 5. However, if the rollers become jammed, then the roller bearing 8 rotates as a unit together with the idle pinion 7, the unit then rotating about the shaft by virtue of the smooth bearing 9. The friction torque developed by the smooth bearing 9 is slightly greater than that which is normally developed by the roller bearing 8, but it is nevertheless not sufficient to drive the shaft 5. Thus, even in the event of the roller bearing 8 jamming, the shaft 5 cannot be driven, unless of course the rotation constraining means have been activated.

In order to verify whether the roller bearing 8 is jammed, the roller bearing 8B in this example is fitted with a sensor 51 for measuring the relative speed of rotation between the two rings of the roller bearing 8B. In order to detect that the aircraft is stationary (in which case it is naturally normal for no relative speed to be detected between the rings of the roller bearing 8B), the device has a sensor 52 for measuring the speed of rotation of the idle pinion 7. It should be observed that the speed of rotation measured by the sensor 52 is the same as the speed of rotation of the outer ring of the roller bearing 8B. By comparing the signals from the sensors 51 and 52, it is easy to deduce the speed of rotation of the inner ring of the roller bearing 8B, which speed ought to be the same as the speed of rotation of the shaft 5 (which is known by other means, e.g. means measuring a speed of rotation of one of the rotary elements of the gearmotor 2). If these speeds do not match, then it is the smooth bearing 9 that is slipping, so there is resistance preventing the two rings of the roller bearing 8B from rotating freely relative to each other. It is thus easy to detect a failure of the roller bearing 8.

The rotation constraining means 50 are described in detail below. They include a sliding gear 16 that is driven in rotation by the shaft 5, while being axially movable between a released position shown in FIG. 1 in which inner fluting 17 carried by a bell-shaped portion 18 of the sliding gear 16 is disengaged from complementary fluting 19 of the idle pinion 7, and an engaged position shown in FIG. 2 in which the fluting of the sliding gear 16 co-operates with the fluting of the idle pinion 7 to constrain the idle pinion 7 in rotation with the shaft 5.

The sliding gear 16 is moved axially by a screw-and-nut assembly 20 extending around the shaft 5. In this example, the screw-and-nut assembly 20 has a nut 21 mounted to rotate in the casing 4 by means of two ball bearings 22, and a hollow screw 23 that co-operates with the nut via a helical connection. The nut 21 forms the rotor of a motor 24, for which there can be seen the stator winding extending around the nut 21.

Rotating the nut 21 causes the screw 23 to move axially, the screw being prevented from rotating by an anti-rotation member that is not shown in this example for greater clarity. The end of the screw 23 presses against the sliding gear 16 via a roller thrust bearing 25. A return spring 26 extends between an abutment 27 associated with the sliding gear 16 and a shoulder 28 of the shaft 5 in order to urge the sliding gear 16 towards its released position, thereby having the effect of pressing the sliding gear 16 against the roller thrust bearing 25, and thus of constraining the sliding gear 16 to move axially with the screw 23.

Thus, rotation of the electric motor 24 causes the nut 21 to rotate and thus causes the screw 23 to move in translation, thereby moving the sliding gear 16 axially.

In this example, the connection between the nut 21 and the screw 23 is reversible. An electromagnetic brake 29 comprising an electromagnet 30 secured to the casing 4 and an armature constrained to rotate with the nut 21 enables the nut 21 to be selectively prevented from rotating, thereby axially holding the sliding gear 16 in the engaged position. For safety reasons, the electromagnetic brake 29 prevents the nut 21 from moving only if the brake 29 is electrically powered.

When the brake 29 is not powered, the sliding gear 16 returns to the released position on its own under drive from the spring 26.

An indicator 32 is secured to the screw 23 so that one end of the indicator moves in a longitudinal groove 33 of the casing 4 in which it is possible to mount sensors in order to detect the engaged and released positions of the sliding gear 16, or indeed, if necessary, in order to detect any intermediate position between those two positions.

In a particular aspect of the invention, the securing means are fitted with a synchronizing device that comprises, in conventional manner:

a synchronizing ring 10 with an inner conical surface 11 suitable for co-operating by friction with an outer conical surface 12 of the pinion 7; and a hub 13 that is constrained in rotation with the shaft 5 by means of a fluted connection, and that includes a fluted outer portion co-operating with the fluting of the sliding gear 16 in order to drive it in rotation. At least some of the outer recesses in the hub 13 are occupied by keys 14 that are urged radially outwardly by spring rings 15.

The operation of such a synchronizing device is well known and is not described in greater detail herein. It suffices to recall that when the sliding gear 16 is thrust towards the idle pinion 7, the conical surface of the synchronizing ring 10 rubs against the complementary outer conical surface of the idle pinion 7. Friction then sets the shaft 5 into rotation until its speed of rotation coincides with that of the idle pinion 7 driven via the toothed ring 3 by the rotating wheel of the aircraft. The synchronizing ring 10 and the idle pinion 7 include indexing means for stopping these two elements angularly in an axial position such that the fluting 18 of the sliding gear 16 is in register with the complementary recesses in the fluting 19 of the idle pinion 7. The sliding gear 16 can then be advanced until it becomes engaged with the idle pinion 7. The idle pinion 7 is then positively connected in rotation with the shaft 5.

The invention is not limited to the above description, but covers any variant coming within the ambit defined by the claims. Although the rolling bearing described herein is a roller bearing with rollers as its rolling elements, any other type of rolling bearing could be used, for example a needle bearing.

What is claimed is:

1. A method of detecting a failure of a rolling bearing in a device connecting a gearmotor to an aircraft wheel, the device comprising:
   a casing rotatably carrying a shaft that is driven by the gearmotor, and on which a pinion is mounted idle by means of the rolling bearing;
      a toothed ring constrained in rotation with the aircraft wheel and arranged to mesh permanently with the idle pinion; and
      rotation securing means selectively constraining the idle pinion in rotation with the shaft;
   wherein a bushing is interposed between the shaft and the rolling bearing of the idle pinion, the method comprising the steps of:
      measuring a relative speed of rotation between an inner ring and an outer ring of the rolling bearing;
      measuring a speed of rotation of the idle pinion;
      deducing therefrom a speed of rotation of the inner ring of the rolling bearing; and
      comparing said deduced speed with a speed of rotation of the shaft.

2. The method according to claim 1, wherein the rolling bearing comprises at least one roller bearing.

3. The method according to claim 1, wherein the device is fitted with a sensor for sensing relative speed of rotation between the rings of the rolling bearing.

4. The method according to claim 1, wherein the device is fitted with a sensor for sensing speed of rotation of the idle pinion.

* * * * *